(12) United States Patent
Anderson et al.

(10) Patent No.: US 9,393,744 B2
(45) Date of Patent: Jul. 19, 2016

(54) APPARATUS FOR PRODUCING COMPOSITE FILLERS

(71) Applicant: The Boeing Company, Chicago, IL (US)

(72) Inventors: Donald A. Anderson, Bellevue, WA (US); Michael Robert Chapman, Federal Way, WA (US); Robert A. Kisch, Auburn, WA (US); Kenneth Paul Zaballos, Burien, WA (US)

(73) Assignee: THE BOEING COMPANY, Chicago, IL (US)

( * ) Notice: Subject to any disclaimer, the term of this patent is extended or adjusted under 35 U.S.C. 154(b) by 179 days.

(21) Appl. No.: 14/083,445

(22) Filed: Nov. 18, 2013

(65) Prior Publication Data

US 2014/0069586 A1    Mar. 13, 2014

Related U.S. Application Data

(62) Division of application No. 13/283,065, filed on Oct. 27, 2011, now Pat. No. 8,591,685.

(51) Int. Cl.
| | |
|---|---|
| *B29C 65/00* | (2006.01) |
| *B29C 70/52* | (2006.01) |
| *B32B 37/00* | (2006.01) |
| *B32B 38/00* | (2006.01) |
| *B29D 99/00* | (2010.01) |
| *B29L 31/00* | (2006.01) |

(52) U.S. Cl.
CPC ............. *B29C 70/526* (2013.01); *B29C 70/52* (2013.01); *B29D 99/0007* (2013.01); *B32B 37/0046* (2013.01); *B32B 38/0004* (2013.01); *B29L 2031/003* (2013.01); *B29L 2031/008* (2013.01); *Y10T 156/1023* (2015.01); *Y10T 156/1031* (2015.01); *Y10T 156/1044* (2015.01); *Y10T 156/1075* (2015.01); *Y10T 156/12* (2015.01); *Y10T 156/125* (2015.01); *Y10T 156/133* (2015.01); *Y10T 156/1317* (2015.01); *Y10T 156/14* (2015.01)

(58) Field of Classification Search
CPC .... B29C 70/52; B29C 70/525; B29C 70/526; B29D 99/0007; Y10T 156/1044
See application file for complete search history.

(56) References Cited

U.S. PATENT DOCUMENTS 2,977,630 A * 4/1961 Bazler ................... B29C 70/525
                                                          156/180
4,410,382 A    10/1983 Varela
(Continued)

FOREIGN PATENT DOCUMENTS

GB    WO 2010007417 A2 * 1/2010 ............ B29C 70/504
WO    WO2007122275 A1    11/2007

OTHER PUBLICATIONS

Extended European Search Report, dated Feb. 18, 2013, regarding Application No. EP12182861.0, 6 pages.
(Continued)

*Primary Examiner* — John Goff
(74) *Attorney, Agent, or Firm* — Yee & Associates, P.C.

(57) ABSTRACT

Apparatus for producing a composite filler includes at least one die and a device for moving a stack of reinforced ply strips through the die. The die has peripheral die face adapted for forming the ply strip stack into a desired cross sectional shape. The cross section of the die face may vary around the periphery of the die.

26 Claims, 18 Drawing Sheets

(56) References Cited

U.S. PATENT DOCUMENTS

| | | | |
|---|---|---|---|
| 4,440,593 A | | 4/1984 | Goldsworthy |
| 4,469,541 A | * | 9/1984 | Goldsworthy ............ B29C 70/50 156/180 |
| 4,559,005 A | | 12/1985 | Gants et al. |
| 4,778,545 A | | 10/1988 | von Derau et al. |
| 4,789,594 A | | 12/1988 | Stawski |
| 4,992,229 A | | 2/1991 | Beever |
| 5,820,804 A | * | 10/1998 | Elmaleh ................ B29C 33/308 156/172 |
| 7,249,943 B2 | * | 7/2007 | Benson ................ B29C 70/388 425/374 |
| 7,534,319 B2 | | 5/2009 | Mead et al. |
| 7,807,005 B2 | | 10/2010 | Rubin et al. |
| 7,852,248 B1 | | 12/2010 | Keramat et al. |
| 8,211,530 B2 | | 7/2012 | Mead et al. |
| 8,216,499 B2 | | 7/2012 | Sherwood et al. |
| 8,591,685 B2 | | 11/2013 | Anderson et al. |
| 2004/0151878 A1 | | 8/2004 | Mead et al. |
| 2007/0044904 A1 | | 3/2007 | Mead et al. |
| 2009/0317587 A1 | | 12/2009 | Deobald et al. |
| 2010/0024966 A1 | | 2/2010 | Felip |
| 2010/0140834 A1 | | 6/2010 | Sherwood et al. |
| 2013/0105072 A1 | | 5/2013 | Anderson et al. |

OTHER PUBLICATIONS

Office Action, dated Feb. 4, 2013, regarding U.S. Appl. No. 13/283,065, 15 pages.

Notice of Allowance, dated Jul. 22, 2013, regarding U.S. Appl. No. 13/283,065, 13 pages.

* cited by examiner

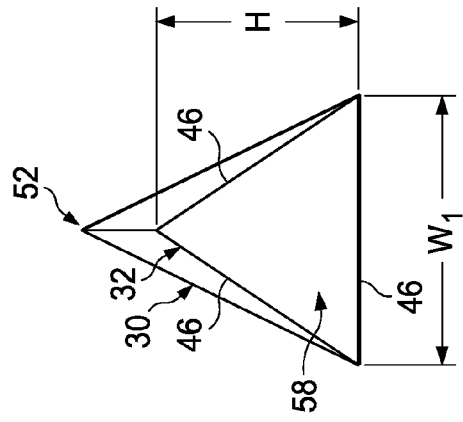
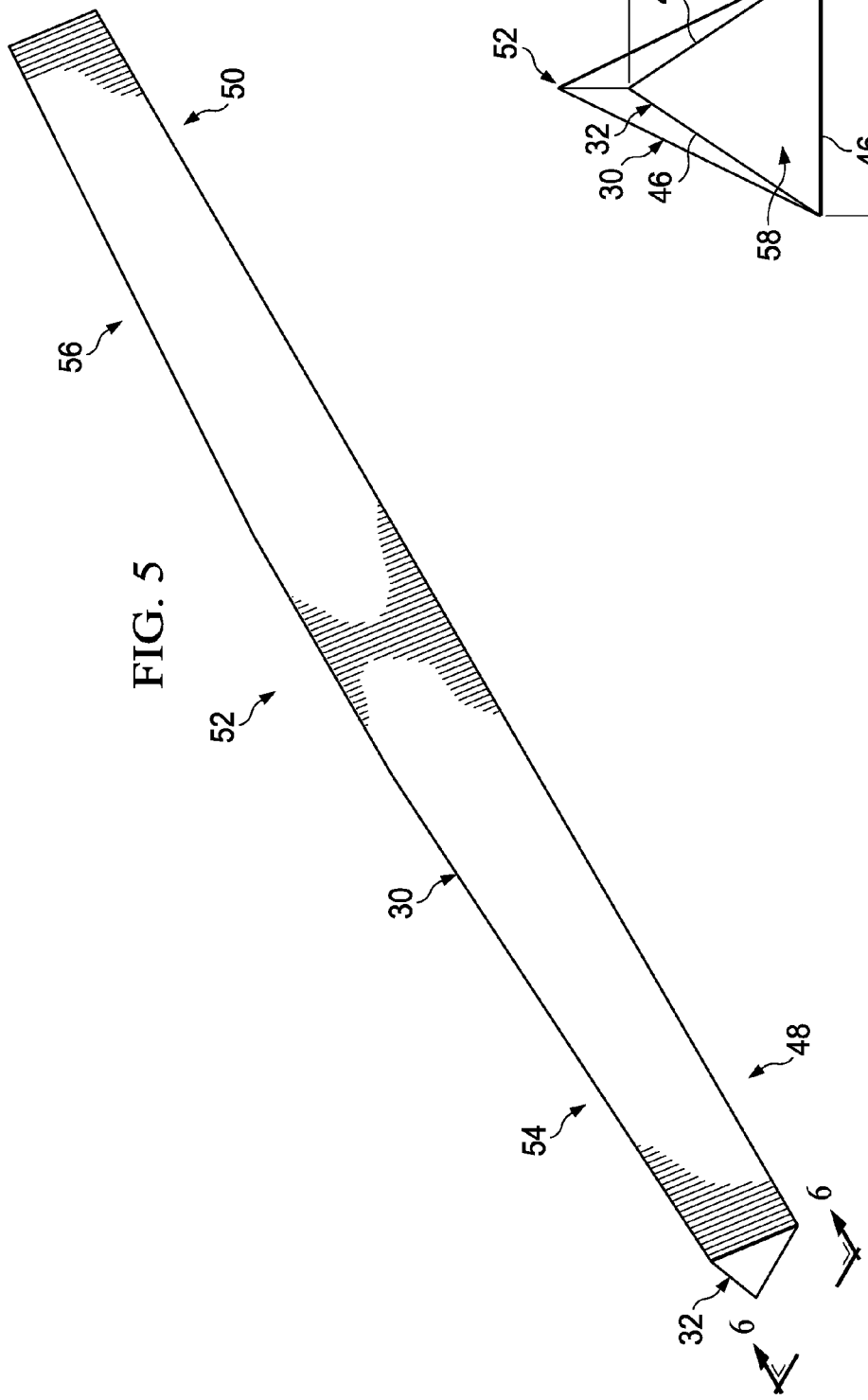

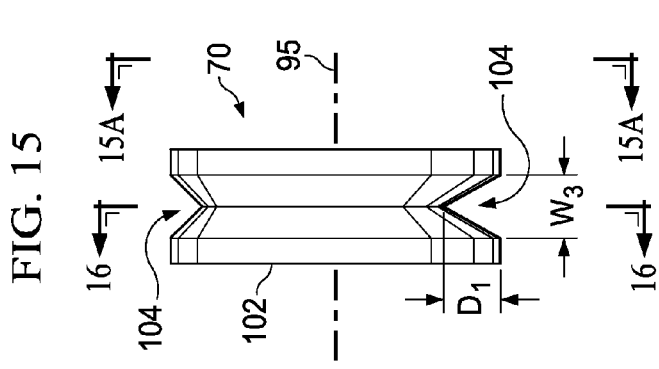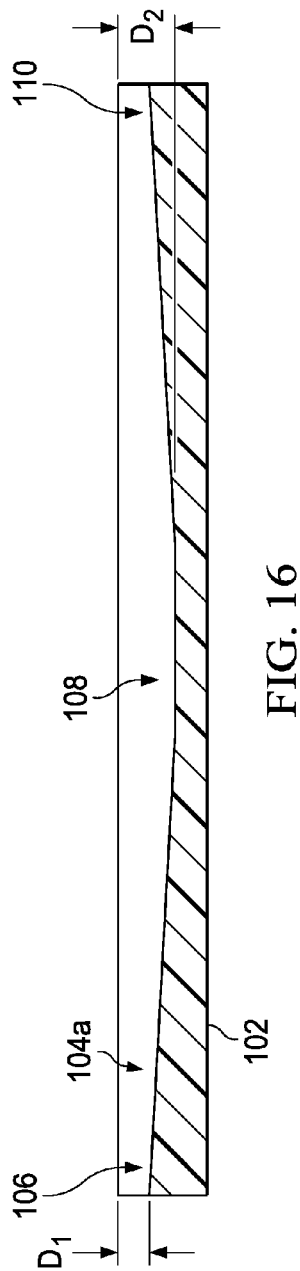

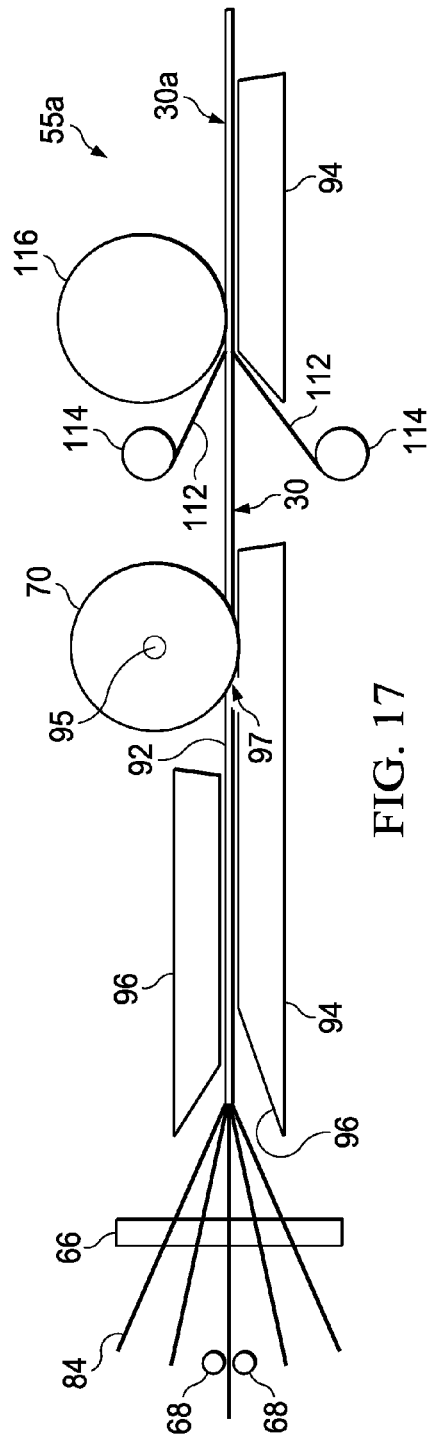
FIG. 17
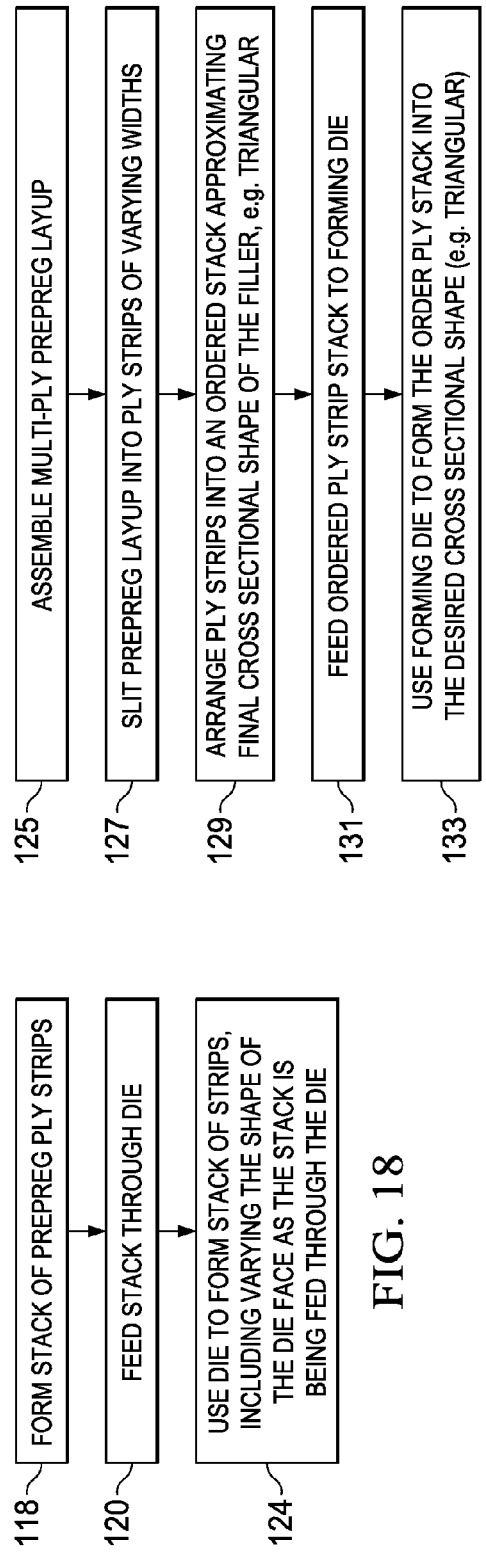
FIG. 18A
FIG. 18

APPARATUS FOR PRODUCING COMPOSITE FILLERS

This application is a divisional application of U.S. patent application Ser. No. 13/283,065, filed Oct. 27, 2011, now U.S. Pat. No. 8,591,685.

BACKGROUND INFORMATION

1. Field

The present disclosure generally relates to the fabrication composite structures, and deals more particularly with a method and apparatus for producing fillers used to fill gaps in such structures.

2. Background

Composite structures may be fabricated by joining two or more members together. In some cases, there may be one or more gaps in areas of joints between the members that may reduce the strength of the joints. In order to strengthen the joints, the gaps are filled with fillers, sometimes also referred to as radius fillers, fillets or noodles. The filler may be formed from composite materials such as adhesive, prepreg tape or fabric. In some cases, the cross section of the gap may vary in size and/or shape along its length as a result of the adjoining composite members converging or diverging from each other. For example, ply pad-ups, ply drop-offs and/or joggles on a composite skin may result in a variable gap between the skin and an overlying stiffener, such as a stringer, that is attached to the skin.

In the past, fillers having variable cross sectional shapes were fabricated using hand layup techniques that involved laminating unidirectional fiber prepreg tape, in which the fiber orientation was parallel to the length of the gap. This hand layup technique required multiple processing steps, was labor intensive and time consuming. Additionally, fillers employing unidirectional fiber reinforcement may be subject to movement and may not exhibit the desired degree of resistance to cracking.

Accordingly, there is a need for a method and apparatus for producing a composite filler having a variable cross section along its length, that are reliable and repeatable, and which reduce labor costs by automating the fabrication process. There is also a need for a method and apparatus as described above which result in a filler having improved stiffness, toughness and/or resistance to cracking.

SUMMARY

The disclosed embodiments provide a method and apparatus for producing a composite filler having improved toughness and strength, and which reduces the time and labor required to produce a filler having varying cross section along its length. Improved filler toughness and strength and achieved by laminating plies of fiber prepreg in which the laminated plies have varying fiber orientations. The method may be carried out by automated equipment that produces laminated fillers of a desired length and varying cross sectional shape and/or area. The apparatus allows an adhesive to be automatically applied to the outer surfaces of the filler, without the need for hand labor. Composite fillers may be produced more quickly and with more repeatable results, using fewer processing steps.

According to one disclosed embodiment, apparatus is provided for producing a composite filler comprising a rotatable die and a device for moving a stack of reinforced strips through the die. The die has a peripheral die face adapted for forming a stack of strips into a desired cross sectional shape. The cross section of the die varies around its periphery. The device for pulling the stack of strips through the die comprises a puller. The apparatus may further comprise a plurality of creels each adapted to hold and dispense one of the strips, and a guide for directing the strips dispensed from the creels into a stack. The guide may include a plurality of aligned slots for respectively guiding the strips into the stack. The apparatus may further comprise a cut and add device for cutting the strips dispensed from the creels and selectively adding strips dispensed to the guide. The apparatus may also comprise a heated chute for guiding and heating the stack of strips that are formed by the die. The die may be substantially circular in shape and rotates about a central axis. The die face may include at least a first circumferential section having a substantially constant cross sectional area, and a second circumferential section having a varying cross sectional area. The apparatus may further comprise a slitter for slitting a layup of prepreg plies into a plurality of prepreg strips, and a redirect device for redirecting the cut prepreg strips into stacked relationship.

According to another disclosed embodiment, apparatus is provided for producing a composite filler, comprising a slitter adapted to slit a multi-ply composite layup into a plurality of side-by-side strips, and a redirect device for redirecting the side-by-side strips into a stack. The apparatus further comprises a forming die for forming the stack of composite strips into a desired cross sectional shape, and a puller for pulling the stack substantially continuously through the slitter, the redirect device and the forming die. The redirect device may include rollers for changing the orientation of the composite prepreg strips relative to each other. The forming die is rotatable and includes a substantially circular die face having a variable cross section around its periphery.

According to still another embodiment, a method is provided of fabricating a composite filler having a cross section that varies along its length. The method comprises forming a stack of composite prepreg strips, feeding the stack of strips through at least one die, and using the die to form the stack of strips, including varying the shape of the face of the die in contact with the stack as the stack is fed through the die. Varying the shape of the die face includes rotating the die as the stack is fed through the die. Forming the stack of strips includes dispensing strips of composite prepreg respectively from a plurality of creels and aligning the strips with each other into a stack.

According to another embodiment, a method is provided of fabricating a composite filler. The method comprises forming a multi-ply composite layup, feeding the layup substantially continuously through a slitter and at least one forming die, and using the slitter to slit the layup into a plurality of side-by-side composite prepreg strips. The method further comprises aligning the composite prepreg strips into a stack as the composite prepreg strips are fed from the slitter to the forming die, and using the die to form the stack of composite strips into the filler. Forming the layup may include laying up unidirectional fiber prepreg plies having at least two different fiber orientations.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 5 is an illustration of a perspective view of a filler having a cross sectional area that varies along its length.

FIG. 6 is an illustration of an end view taken in a direction designated as FIG. 6 in FIG. 5.

FIG. 15 is an illustration of an end view of the forming die taken in the direction shown as FIG. 15 in FIG. 12.

FIG. 15A is an illustration of a side view taken in the direction shown as 15A in FIG. 15.

FIG. 16 is a rectilinear layout of the circumference of the die shown in FIGS. 12 and 15, taken along the line 16-16.

FIG. 17 is an illustration similar to FIG. 12, but showing an alternate embodiment of the apparatus employing an adhesive applicator.

FIG. 18 is an illustration of a flow diagram of a method of fabricating a composite filler having a cross section that varies along its length.

FIG. 18A is an illustration of a flow diagram of an alternate method of fabricating a composite filler.

DETAILED DESCRIPTION

Figure 1:
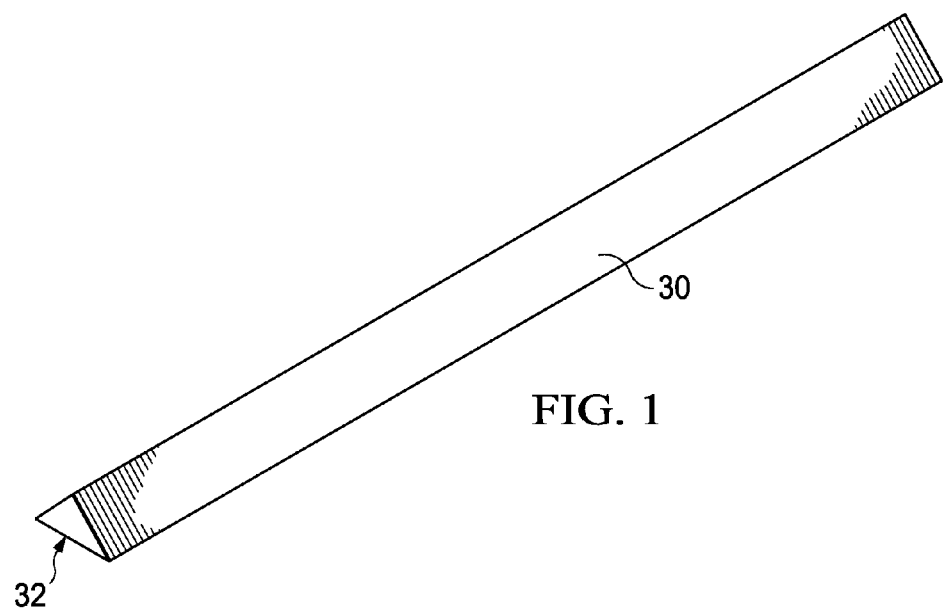
FIG. 1 is an illustration of a perspective view of a composite filler.
Figure 2:
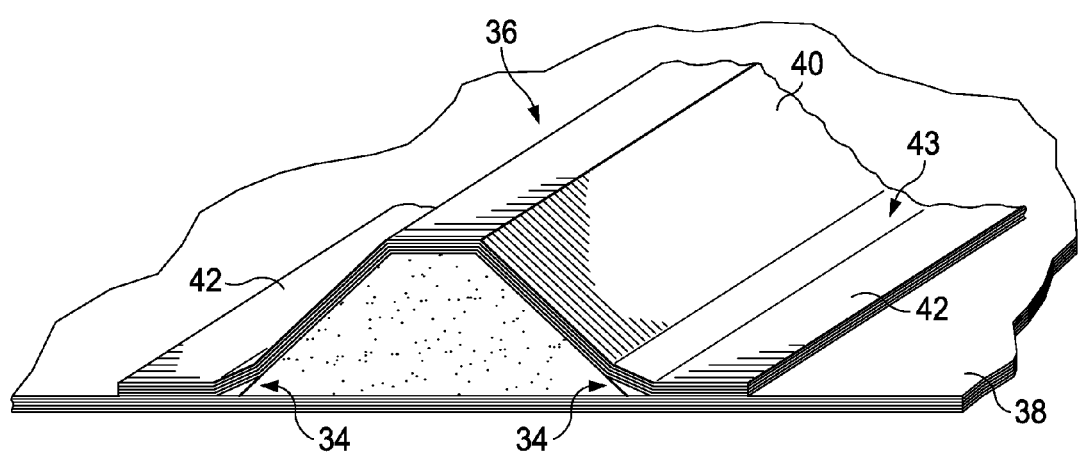
FIG. 2 is an illustration of a cross sectional, perspective view showing gaps between a stringer and a skin that may be filled with a composite filler.
Figure 3:
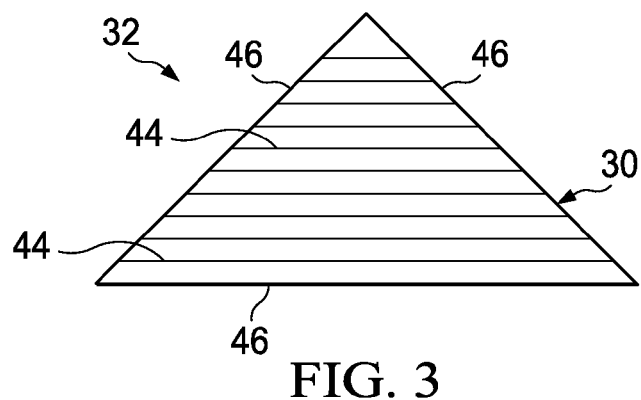
FIG. 3 is an illustration of an end view of the filler shown in FIG. 1.

Referring first to FIGS. 1-3, the disclosed embodiments relate to a method and apparatus for producing a composite filler 30 suitable for filling gaps between composite members, such as, without limitation, a stringer 36 attached to a skin 38. The stringer 36 includes a hat section 40 joined to a pair of flanges 42 by a radius section 43 that results in gaps 34 that are generally triangular in cross sectional shape along the length of the stringer 36. In some applications, the cross section of the gaps 34 may vary along the length of the gap 34, either in its area or in its shape, or both. This variance may be caused, for example and without limitation, by ply drop-offs, pad-ups, or joggles (not shown) in the skin 38, and/or curvatures in either the stringer 36 or the skin 38. The stringer 36 and skin 38 are merely illustrative of a wide range of joined structural members having variable gaps that may require a filler 30 in order to improve structural performance.

Figure 4:
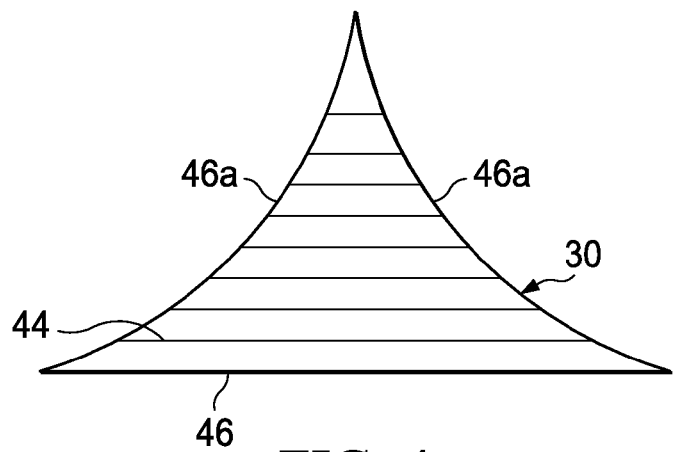
FIG. 4 is an illustration of an end view of a filler having an alternate cross sectional shape.
Figure 4A:
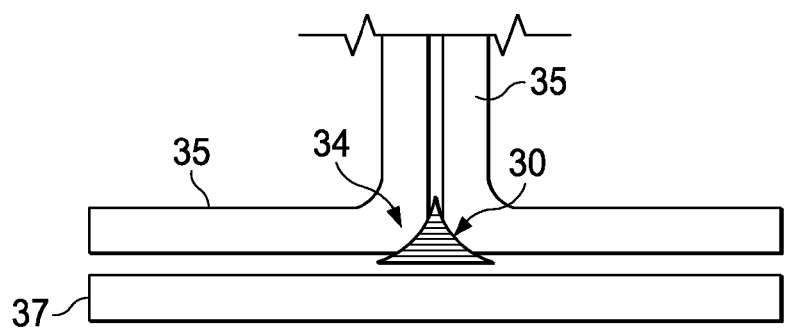
FIG. 4A is an illustration of a cross sectional view of a portion of three structural members of an I-beam being joined together and having a gap therebetween filled by the filler shown in FIG. 4.

Referring to FIG. 3, the filler 30 may comprise a plurality of laminated plies 44 of unidirectional fiber prepreg. As will be discussed later below in more detail, the fiber orientations of the plies 44 may be the same or different, according to a predetermined ply schedule suitable for the application. In the illustrated example, the filler 30 has a generally triangular cross sectional shape 32 formed by three sides 46. Other cross sectional shapes 32 are possible. For example, FIG. 4 illustrates a filler 30 having a substantially flat side 46 and two radiused sides 46a. The filler 30 shown in FIG. 4 may be suitable for use in filling a gap 34 between a pair of back-to-back L or U-shaped shaped structural members 35, and a cap 37 that are joined together to form an I-Beam (only partially shown in FIG. 4A). The cross sectional shapes of the fillers 30 shown in FIGS. 1 and 4 are merely illustrative of a wide range of cross sectional shapes that are possible. For example, and without limitation, the cross sectional shape of filler 30 may have any number of straight sides, curves or a combination of curves and straight sides which may vary in area or geometry along the length of the filler 30, and which may correspond to the changing cross sectional profile of the gap 34 along its length. A filler 30 having a cross sectional shape formed by straight sides at one end of the filler 30 may transition either linearly or non-linearly, into a cross sectional shape having one or more curves at any point along the length of the filler 30.

Referring now to FIGS. 5 and 6, as previously discussed, in some applications the cross section of the filler 30 may vary along its length. For example, the cross sectional shape 32 and/or the cross sectional area 58 of the filler 30 may vary continuously or along only portions of the length of the filler 30. In the example shown in FIGS. 5 and 6, the cross sectional shape 32 remains the same, i.e. remains triangular, throughout the length of the filler, however the height H and width $W_1$, and thus the area of the cross section varies. For example, the cross sectional area 58 at one end 48 increases steadily at 54 to an intermediate section 52 where the cross sectional area 58 remains substantially constant, but then steadily decreases at 56 to the other end 50. The cross sectional area 58 of the filler 30 is greatest and remains substantially constant throughout the intermediate section 52, but varies linearly throughout sections 54 and 56. As previously stated, the cross sectional area 58 may vary at any rate of increase or decrease, or remain constant at any section along the length of the filler 30.

Figure 7:
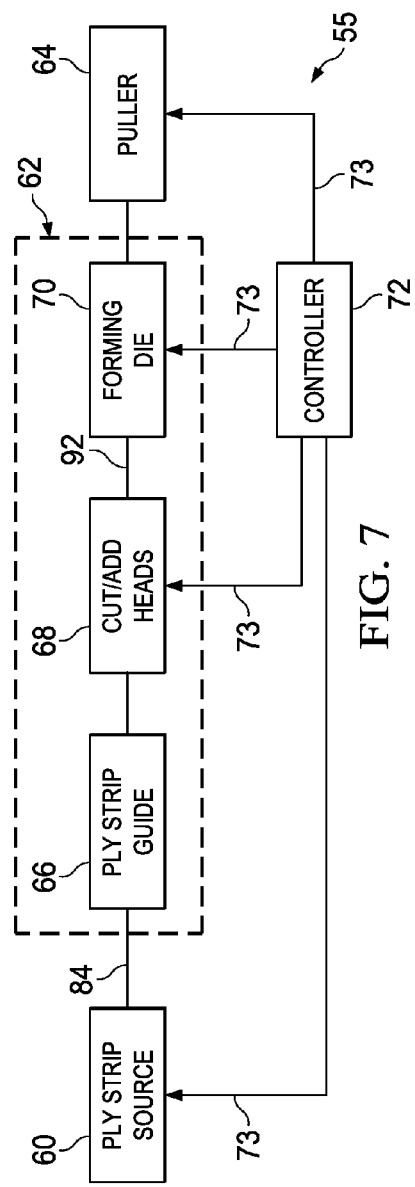
FIG. 7 is an illustration of a functional block diagram of apparatus for producing the filler shown in FIGS. 5 and 6.

Referring now to FIG. 7, apparatus generally indicated at 55 for producing a composite filler 30 broadly comprises a source 60 of pre-plied fiber reinforced strips 84, hereinafter referred to ply strips or reinforced strips 84 are pulled through a delivery head 62 by a puller 64. The delivery head 62 includes a ply strip guide 66 that directs the ply strips 84 through cut/add heads 68 into an ordered ply stack 92. At least one forming die 70 is employed to form the ply strip stack 92 into a filler 30 having the desired cross sectional shape and/or size along its length. In some embodiments, the ply strip stack 92 may be directed by the guide 66 through more than one forming die 70. The cut/add heads 68 are operated by control signals issued by the controller 72 (FIG. 7) and may comprise devices similar to those described in U.S. Pat. No. 4,699,683, issued Oct. 13, 1987, U.S. Pat. No. 7,213,629 issued May 8, 2007 and US Patent Publication No. 20070029030A1 published Feb. 8, 2007, the entire contents of which are incorporated by reference herein. In one embodiment, the ply strip source 60 may comprise a composite ply layup 74 (FIG. 9) that is slit into individual ply strips 84 (FIG. 10) either before or after entering the delivery head 62. The prep-plied layup 74 may be slit into the ply strips 84 using any suitable cutting device, such as for example and without limitation, a Gerber cutter. The ply strip source 60 along with the cut/add heads 68, forming die 70 and puller 64 may be operated by a controller 72 which may comprise a PC or a PLC (programmable logic controller) that outputs control signals on lines 73.

Figure 8:
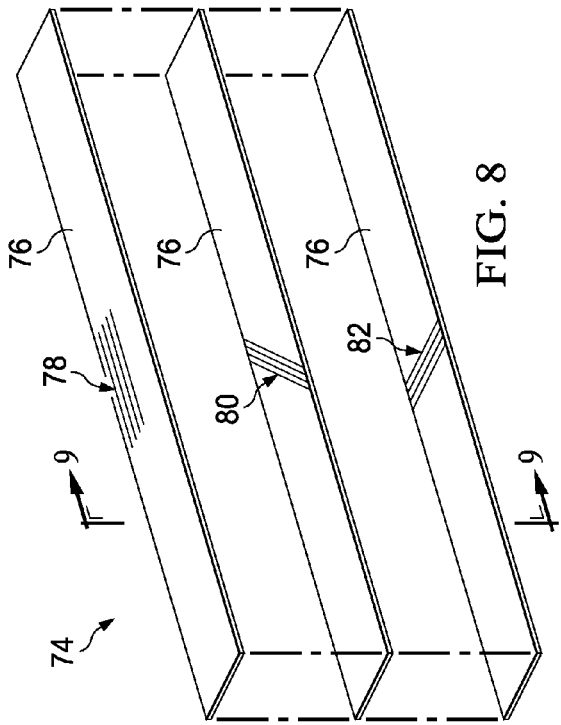
FIG. 8 is an illustration of an exploded, perspective view of a ply layup that may be used to fabricate a filler using the apparatus shown in FIG. 7.
Figure 9:
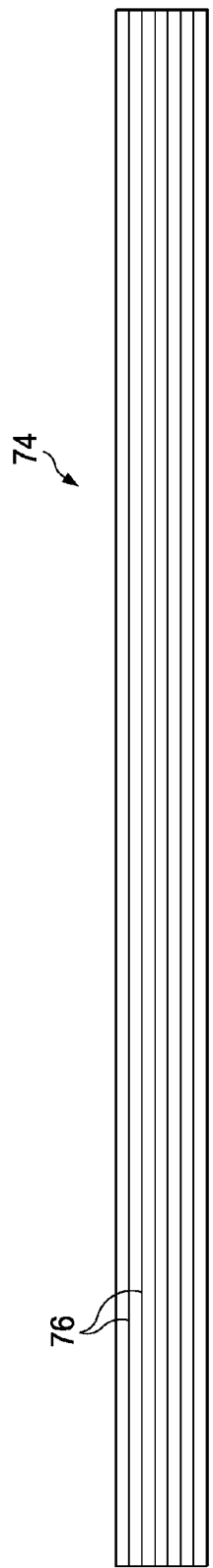
FIG. 9 is an illustration of an end view of the ply layup shown in FIG. 8.
Figure 10:
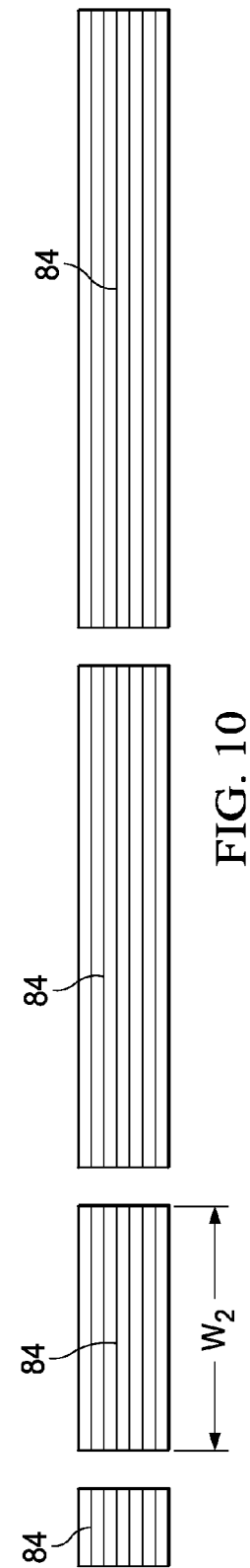
FIG. 10 is an illustration of an end view showing the ply layup of FIG. 9 having been slit into individual prepreg strips.

Referring now to FIGS. 8, 9 and 10, as previously mentioned, the filler 30 may be formed from a ply layup 74 comprising a plurality of plies 76 of unidirectional fiber prepreg that are assembled ply-by-ply, according to a predetermined supply schedule (not shown), using either hand-layup techniques or an AFP (automatic fiber placement) machine (not shown). The fiber orientation of the plies 76 may vary from ply-to-ply. For example, as shown in FIG. 8, the plies 76 may have a 0 degree fiber orientation 78, a 45 degree fiber orientation 80, or a 90 degree fiber orientation 82, as well as other orientations within a particular layup 74. The ply layup may include plies having at least two types for fiber reinforcing fibers, such as glass fibers and carbon fibers, in order to fabricate fillers 30 known as "hybrid fillers". Other fiber reinforcements are possible. Following assembly, the ply layup 74 (FIG. 9) is slit into a plurality of ply strips 84 as shown in FIG. 10, each comprising one or more individual plies 76 of the same or differing fiber orientations. The ply strips 84 may vary in width $W_2$, depending upon the cross sectional shape of the filler 30 being fabricated.

Figure 11:
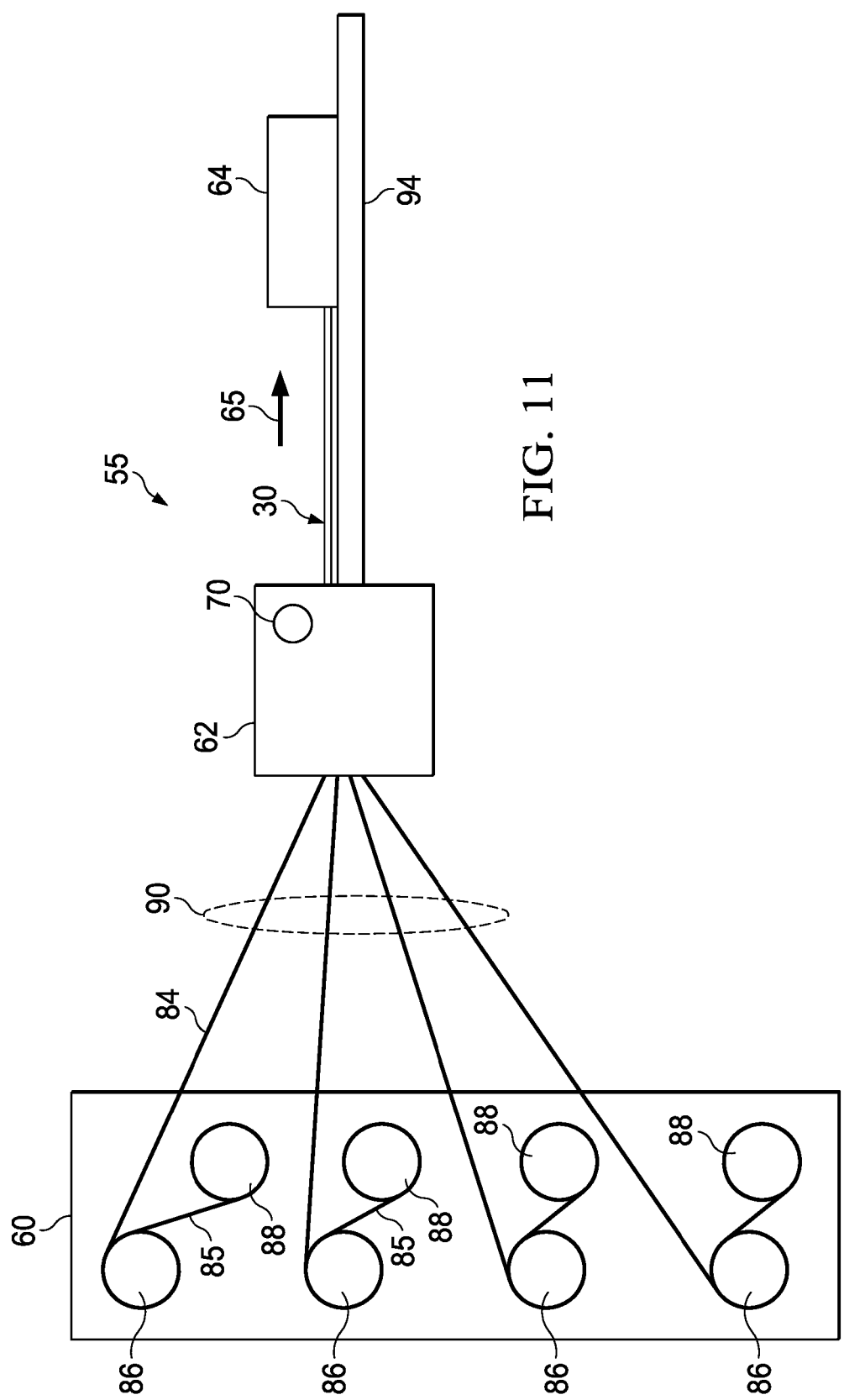
FIG. 11 is an illustration of a diagrammatic, side view of one embodiment of the apparatus shown in FIG. 7.
Figure 14:
FIG. 14 is an illustration of an end view of a stack of the ply strips, prior to being formed by the die.

Attention is now directed to FIG. 11 which broadly illustrates components of one embodiment of the apparatus 55. In this example, the ply strip source 60 comprises a plurality of creels 86 respectively wound with ply strips 84 that may be of differing widths $W_2$ (FIG. 10). A set of take-up reels 88 are provided to take up backing paper 85 that is removed from the ply strips as they are dispensed from the creels 86. The ply strips 84 dispensed from the creels 86 are aligned with each other and fed as a group 90 to a delivery head 62 where the ply strips 84 are guided into a stack 92 (FIG. 14) that is heated to a forming temperature and formed by at least one die 70 into the final cross sectional shape of the filler 30. As previously mentioned, in some embodiments, the stack 92 may formed into the final cross sectional shape using more than one of the dies 70. The stack 92 is moved through the delivery head 62 by a suitable motorized puller 64 which pulls the formed filler 30 in the direction shown by the arrow 65 over a flat lower die 94, causing the ply strips 84 to be drawn from the creels 86. Operation of the puller 64 is controlled by the controller 72 shown in FIG. 7. The process of pulling the stack 92 through the delivery head and drawing ply strips 84 from the creels 86 is carried out substantially continuously and automatically until the desired length of the filler 30 is completed. In some embodiments, the operation of the creels 86 may be controlled by control signals from the controller 72 shown in FIG. 7.

Figure 12:
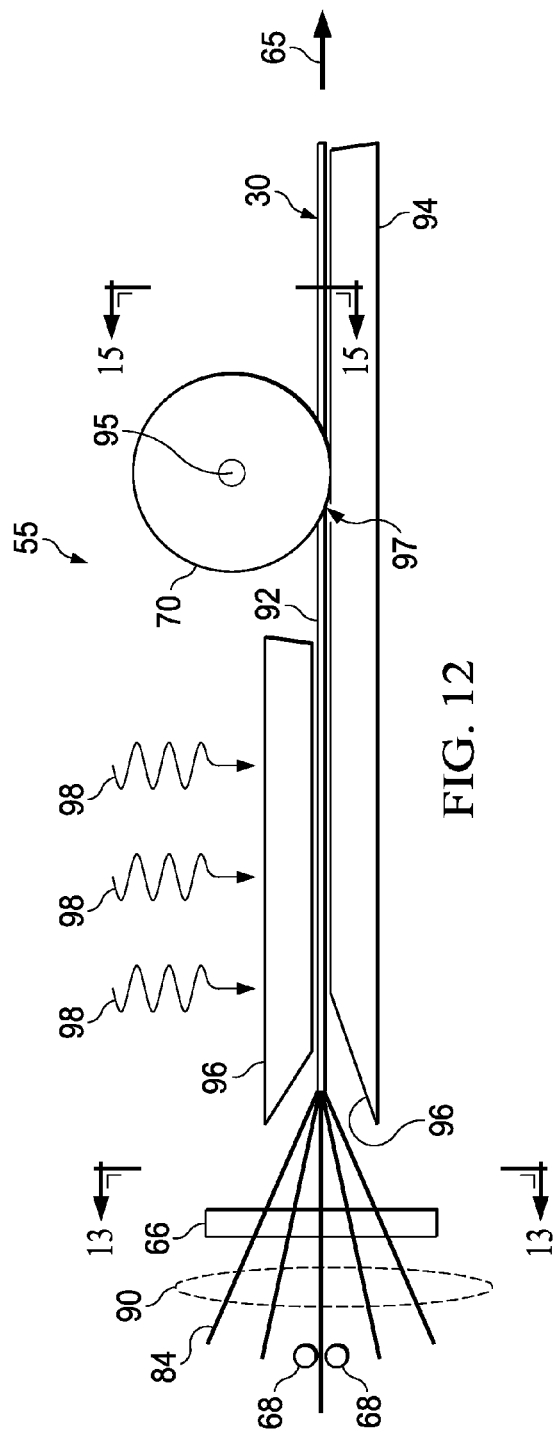
FIG. 12 is an illustration of a diagrammatic side view showing additional details of the apparatus shown in FIG. 11.
Figure 13:
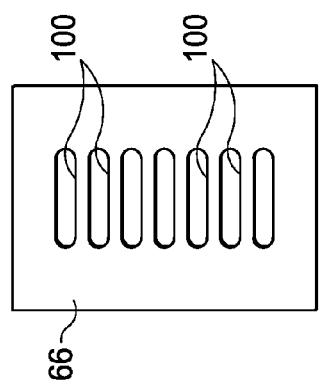
FIG. 13 is an illustration of a ply strip guide taken in the direction shown as FIG. 13 in FIG. 12.

FIG. 12 illustrates additional details of the apparatus 55 shown in FIG. 11. The ply strips 84 dispensed from creels 86 respectively pass through cut/add heads 68 which cut and add ply strips 84 as required, to the lengths needed to produce a filler 30 of a desired length. The ply strips 84 pass, as a group 90, through a guide 66 shown in FIGS. 12 and 13 which includes a plurality of aligned slots 100. The slots 100 align the ply strips 84 and guide them into a chute 96 that may be heated by any suitable means at 98. The chute funnels the aligned ply strips 84 into an ordered stack 92 shown in FIG. 14 which has a cross section that roughly approximates the cross sectional shape and area of the completed filler 30. The chute 96 also heats the stack 92 to a forming temperature and guides the stack 92 into a nip 97 between the forming die 70 and flat lower die 94, drawn by the force applied to the stack 92 by the puller 64 (FIG. 11) as the puller 64 pulls the completed filler 30 in the direction shown by the arrow 65. The lower die 94 may or may not form an extension of the heated chute 96. The die 70 may be driven to rotate by a motor (not shown) operated by the controller 72 shown in FIG. 7 which synchronizes the rotation of the die 70 with the speed of the puller 64. As previously noted, more than one die 70 may be employed in series to form the stack 92 into the desired cross sectional shape.

Referring now to FIGS. 12, 15, 15A and 16, the forming die 70 is generally circular about a central axis of rotation 95. The die 70 includes a concave die cavity 104 (FIG. 15) formed by a peripheral die face 102. In the illustrated example, the die cavity 104 is generally triangular in cross sectional shape, and has a depth $D_1$ and a width $W_3$ that vary around the circumference of the die 70. Thus, the cross section of the die face 102 in contact with the stack 92 of ply strips 84 may vary as the die 70 rotates and the stack 92 moves through the die 70. FIG. 16 schematically illustrates the varying cross section profile of the die cavity 104, represented by the change in depth $D_1$ around the circumference of the die 70. The depth $D_1$ increases steadily from a depth $D_1$ at 106 to a depth $D_2$ at 108 and then decreases to $D_1$ at 110. As is apparent from FIG. 16, the cross sectional profile of the die cavity 104 substantially corresponds to the cross sectional shape of the filler 30 shown in FIGS. 5 and 6. The die cavity 104 may have any of a variety of other cross sectional shapes that vary around the circumference of the die 70, depending on the geometry of the filler 30 being fabricated. As previously mentioned, the controller 72 (FIG. 7) controls the rotational position of the die 70 and synchronizes the die's rotational position with the rate at which the puller (FIGS. 7 and 10) pulls the filler 30 through the die 70 in order to vary the die face 102 in contact with the ply stack 92 as the ply stack passes into the nip 97.

In some applications, it may be desirable to apply an adhesive to outer surfaces of the filler 30 which aids in bonding the filler 30 to surrounding structural members forming the gap 34 shown in FIG. 2, such as the stringer 36 and the skin 38. Adhesive may be applied to filler 30 using a modified form of the apparatus 55a shown in FIG. 17 that includes an adhesive dispenser. Adhesive film strips 112 may be dispensed from a pair of reels 114 and applied to the exterior sides 46 (FIG. 3) of the filler 30 using a rotating cam 116. Cam 116 has a variable cross section cam face substantially matching that of the just-formed filler 30 and functions, along with a flat lower die 94, to press the adhesive film strips 112 onto the sides 46 of the filler 30 as the filler 30 and the film strips 112 pass between the cam 116 and the flat lower die 94.

FIG. 18 illustrates the overall steps of a method of producing the filler 30 using the previously described apparatus 55. Beginning at step 118, a stack 92 of prepreg ply strips 84 is formed, and at 120, the stack 92 of ply strips 84 is fed through one or more forming dies 70. At 124, the forming die 70 is used to form the stack 92 of ply strips 84, including varying the shape of the die face 102 as the stack 92 is being fed through the die 70.

FIG. 18A broadly illustrates the steps of an alternate method of producing the filler 30 using the apparatus 55. Beginning at step 125, a multi-ply layup 74 of fiber prepreg is assembled, in which the plies may have differing fiber orientations determined by a predetermined ply schedule. At 127, the layup 74 is slit into individual ply strip 84 having varying widths which are related to the cross sectional shape of the particular filler 30 being fabricated. At step 129, the slit ply strips are arranged into a ordered stack 92 according to their widths, such that the stack 92 may have a cross sectional shape that approximates the final cross section shape of the filler 30 (see FIG. 14). The ordered stack 92 of ply strips 84 is fed to one or more forming dies 70 at step 131, and at 133, the forming die(s) 70 is used to form the stack 92 into a filler 30 having the desired cross sectional shape, which may vary along the length of the filler 30.

Figure 19:
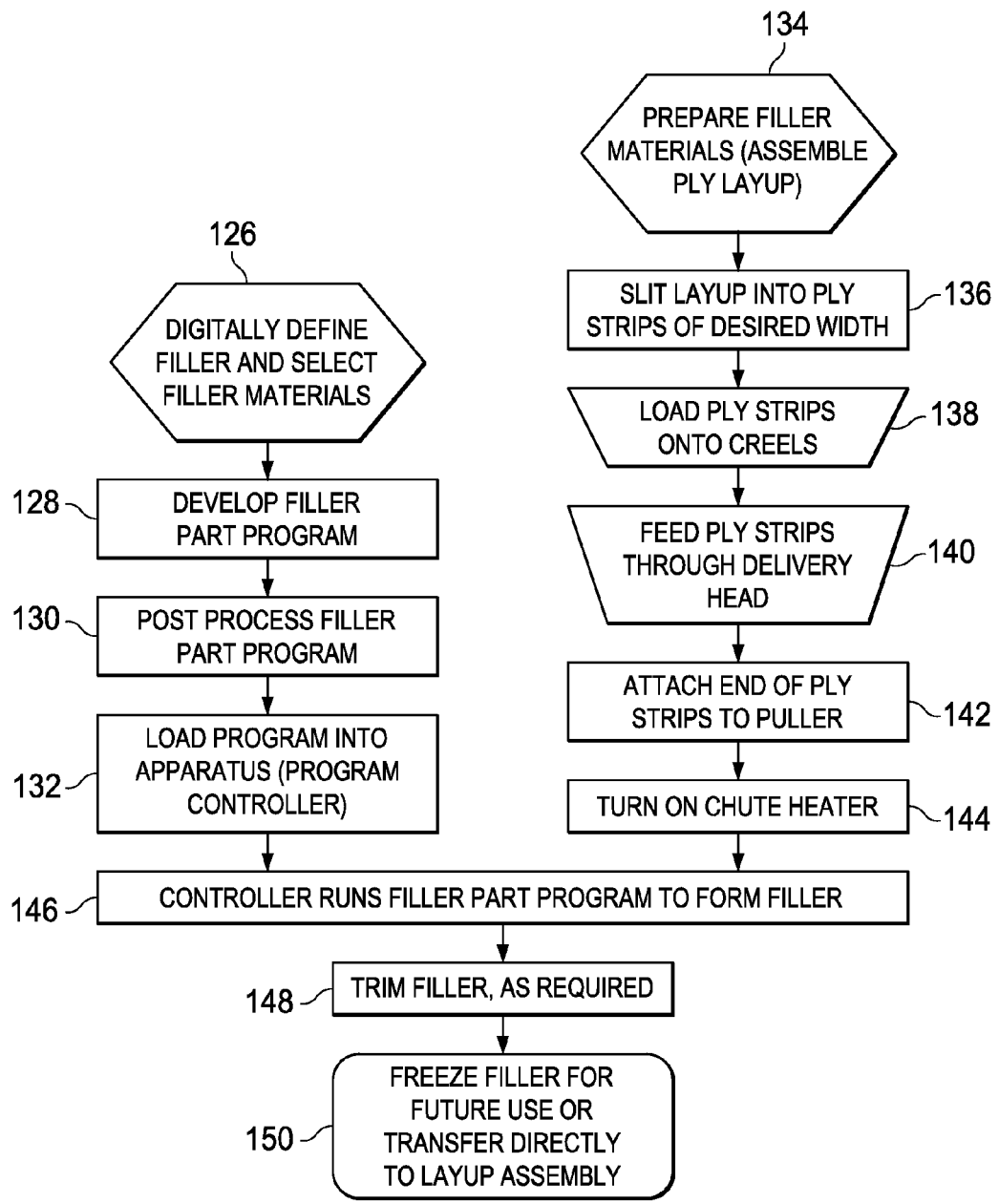
FIG. 19 is an illustration of a flow diagram illustrating additional steps of the method shown in FIG. 18.

FIG. 19 illustrates additional steps of one practical implementation of the method shown in FIG. 18. At 126, the geometry of the filler 30 is digitally defined and the materials from which the filler 30 is made are selected. At step 128, a program is developed for producing the filler 30 and at 130 the program is post processed. At step 132, the program is loaded into the apparatus 55, which includes programming the controller 72. At step 134, the materials from which the filler 30 is formed are prepared, which includes assembling a ply layup 74. At 136, the ply layup 74 is slit into multiple ply strips 84 of the desired widths. At 138, the ply strips 84 are respectively loaded onto creels 86, and at 140, the ply strips 84 are fed through the delivery head 62 of the apparatus 55. At 142, the ends of the ply strips 84 are attached to the puller 64 and at 144 the heaters are turned on the heat the chute 96. At 146, the controller 72 runs the part program to form the filler 30, and at 146 the filler 30 may be trimmed to final length, as required. Finally, at 150, the filler 30 may be frozen for future use or, alternatively, transferred directly to a composite layup assembly (not shown) for use in filling a gap.

Figure 20:
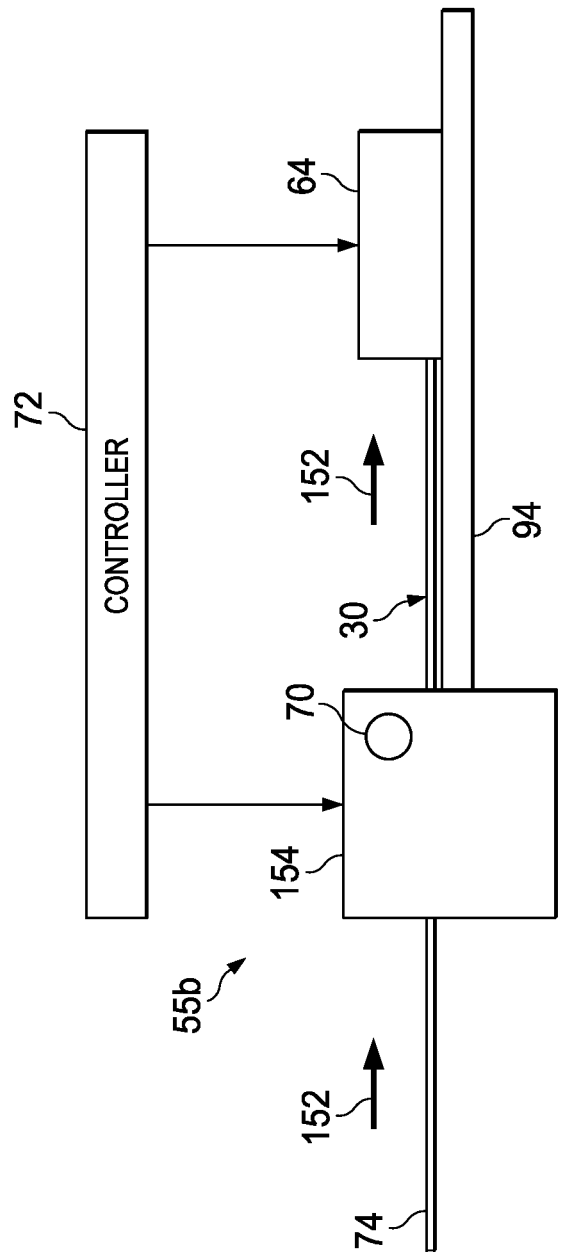
FIG. 20 is an illustration of a diagrammatic side view of an alternate form of the apparatus employing a ply slitter.
Figure 21:
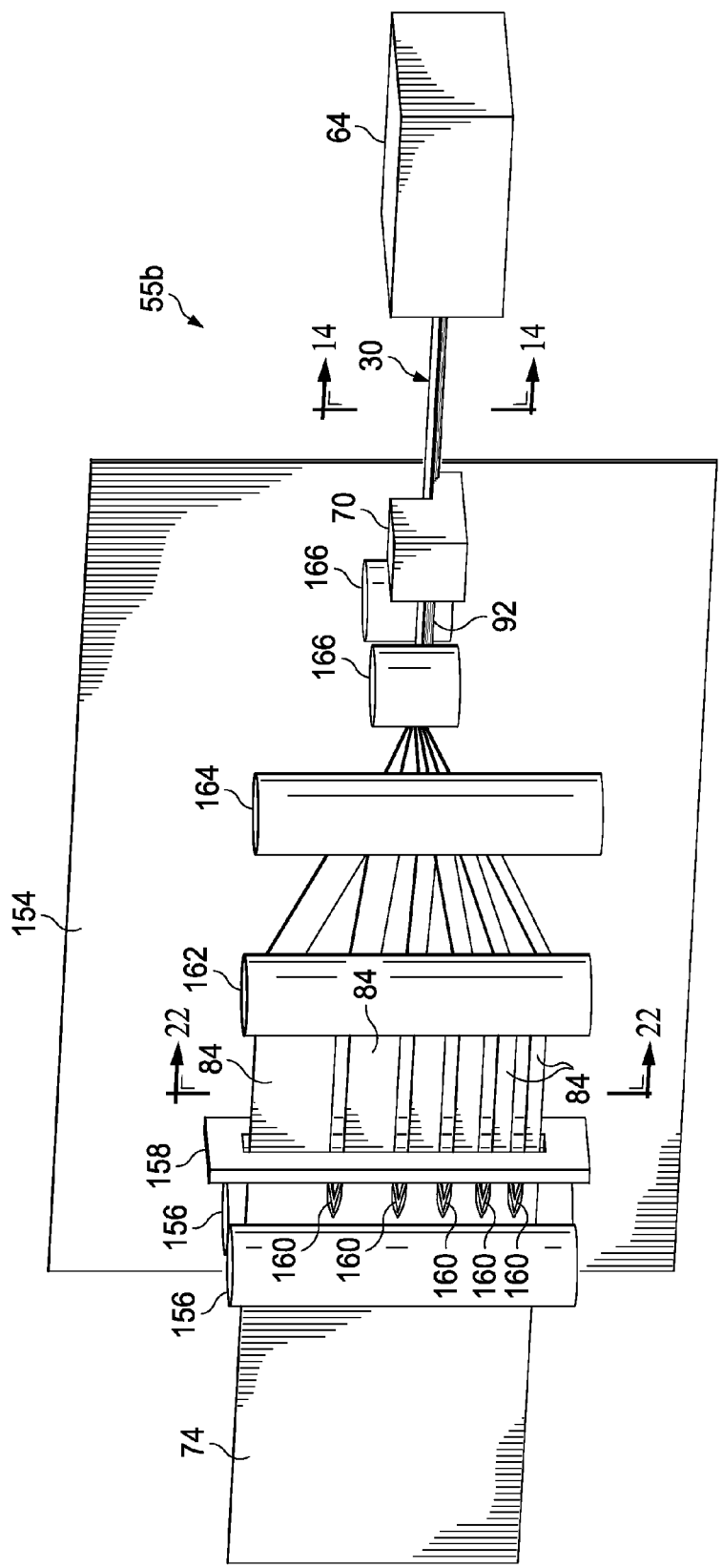
FIG. 21 is an illustration of a plan view of the apparatus shown in FIG. 20.

Attention is now directed to FIGS. 20 and 21 which illustrates another embodiment of the apparatus 55b. In this embodiment, an assembled, multi-ply layup 74 is fed in the direction 152 to a slitter/laminator machine 154 that includes one or more forming dies 70 that may be similar to that previously described. The layup 74 may include one or more plies of unidirectional fiber prepreg of the same or differing fiber orientations, and may include one of more plies of an adhesive. A puller 64 is used to pull the layup 74 through the machine 154. Machine 154, as well as the puller 64 are operated by a suitable controller 72.

Figure 22:
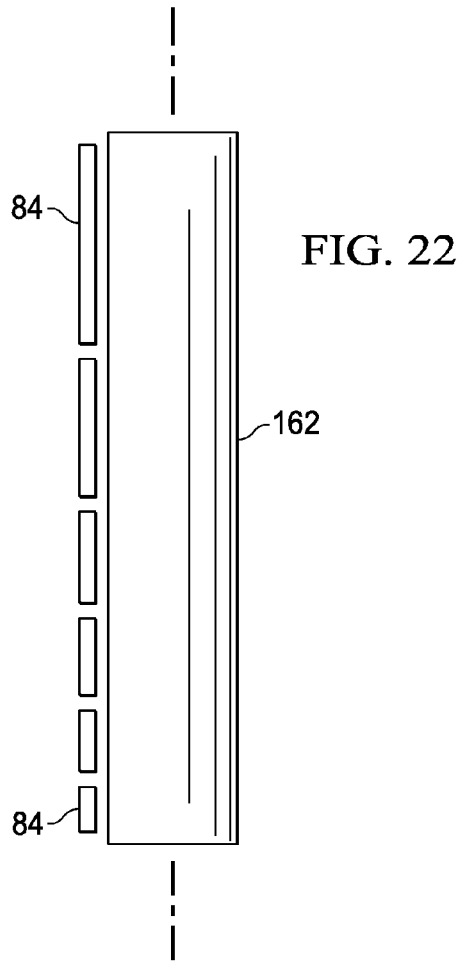
FIG. 22 is an illustration of a sectional view taken along the line 22-22 in FIG. 21.

Referring now particularly to FIGS. 21 and 22, the machine 154 broadly comprises a pair of nip rollers 156, a slitter 158, redirect rollers 162, 164, compaction rollers 166 and forming die 70. An assembled (pre-plied) layup 74 is fed into the nip rollers 156 which pull the layup 74 into the slitter 158. The slitter 158 comprises a plurality of spaced apart cutter blades 160 which are spaced apart from each other at differing distances and slit the layup 74 into a plurality of side-by-side, individual strips 84 of varying, preselected widths, each comprising one or more composite plies. The redirect rollers 162, 164 function to turn the side-by-side strips ninety degrees, redirecting the strips 84 into alignment with each other and into a stack 92 that is compacted by rollers 166 and fed through one or more forming dies 70 (only one being illustrated in FIG. 21). The forming die 70 may be similar to the rotatable forming die 70 previously described having a peripheral die cavity 104 (FIG. 15) that may or may or may not vary in shape and/or area around the circumference of the die 70. In other embodiments, the die 70 may comprise one or more suitable type of stationary extrusion dies, rather that a rotatable forming die 70 of the type shown in FIGS. 12, 15 and 15A.

Figure 23:
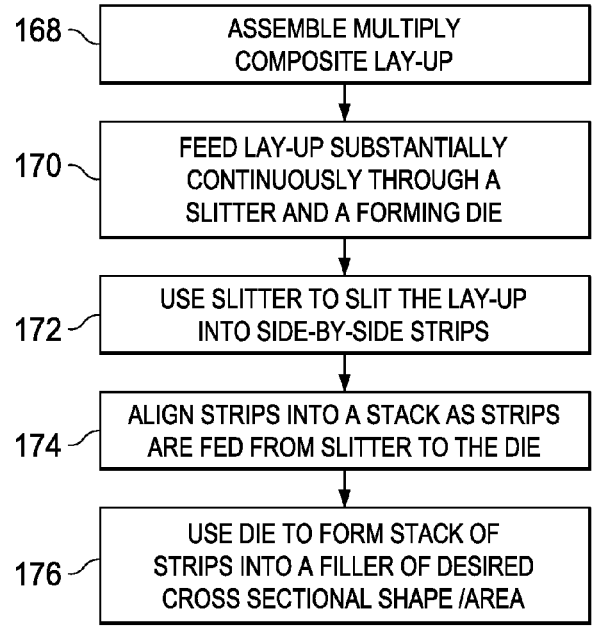
FIG. 23 is an illustration of a flow diagram of a method of fabricating a composite filler using the apparatus shown in FIGS. 20 and 21.

FIG. 23 illustrates the overall steps of a method of producing a filler using the apparatus 55b shown in FIGS. 20-22. Beginning at step 168, a multi-ply composite layup 74 is assembled, and at 170, the layup 74 is fed substantially continuously through a slitter 158 and a forming die 70. At 172, the slitter 158 is used to slit the layup 74 into a plurality of side-by-side ply strips 84. At 174, the ply strips 84 are aligned into a stack 92 as the strips 84 are being fed from the slitter 158 to the die 70. At 176, the die 70 is used to form the stack 92 of ply strips 84 into a filler 30 of the desired cross sectional shape and area.

Figure 24:
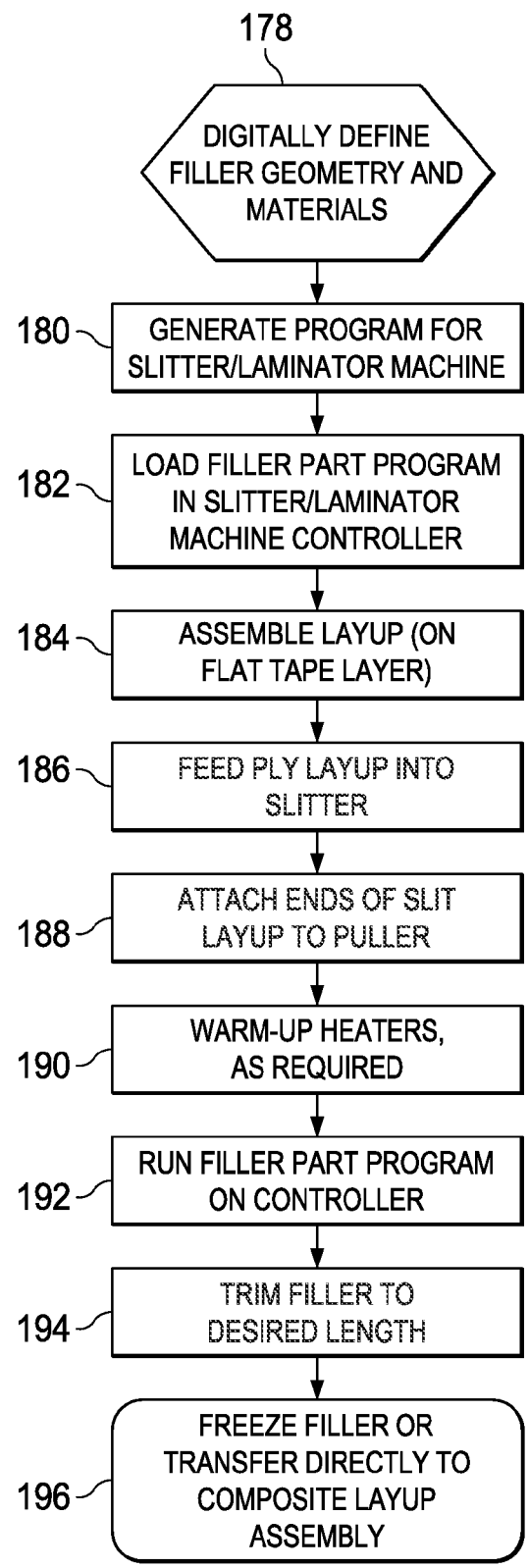
FIG. 24 is an illustration of a flow diagram showing additional steps of the method shown in FIG. 23.

FIG. 24 illustrates additional details of the method shown in FIG. 23. At 178, the geometry of the filler 30 is digitally defined and the materials used to produce the filler 30 are selected. At 180 a program is generated for controlling the machine 154, and at 182 the program is loaded into the machine controller 72. At 184, a layup 74 is assembled and placed on a flat tape layer. At 186, the layup 74 is fed into the slitter 158 and at 188 the slit ply stack 92 is attached to the puller 64. At 190, heaters, if used in the machine 154 to preheat the layup 74, are pre-heated. At 192, the program is run which controls operation of the machine 154 to produce the filler 30. At 194, the filler 30 is trimmed to length and at 196, the filler 30 may be either frozen for future use, or transferred directly to a composite layup assembly for use in filling a gap.

Figure 25:
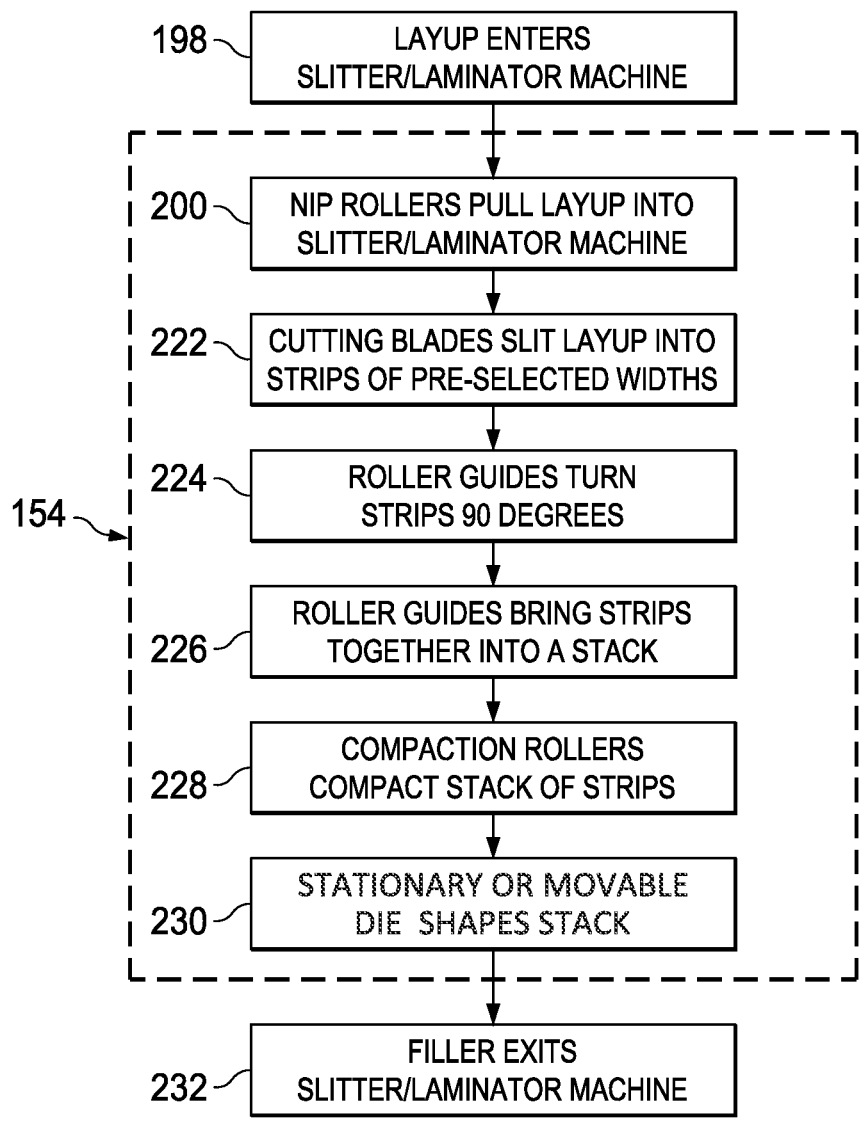
FIG. 25 is an illustration showing the sequential steps performed by the apparatus shown in FIGS. 20 and 21.

FIG. 25 illustrates the sequential operations performed by the machine 154. Beginning at 198, the assembled ply layup enters the machine 154. The nip rollers 156 pull the layup 74 into the machine 154 and at 222, the slitter 158 slits the layup 74 into multiple ply strips 84 of the desired width. At 224, redirect rollers 162 turn the strips 84 ninety degrees, and at 226 redirect rollers 164 bring the strips 84 together into a stack 92. At 228, the compaction rollers 166 compact the stack 92. At 230, a die 70, which may be stationary or movable as previously described, shapes the stack 92 into the desired filler shape. The filler exits the machine at 232.

Figure 26:
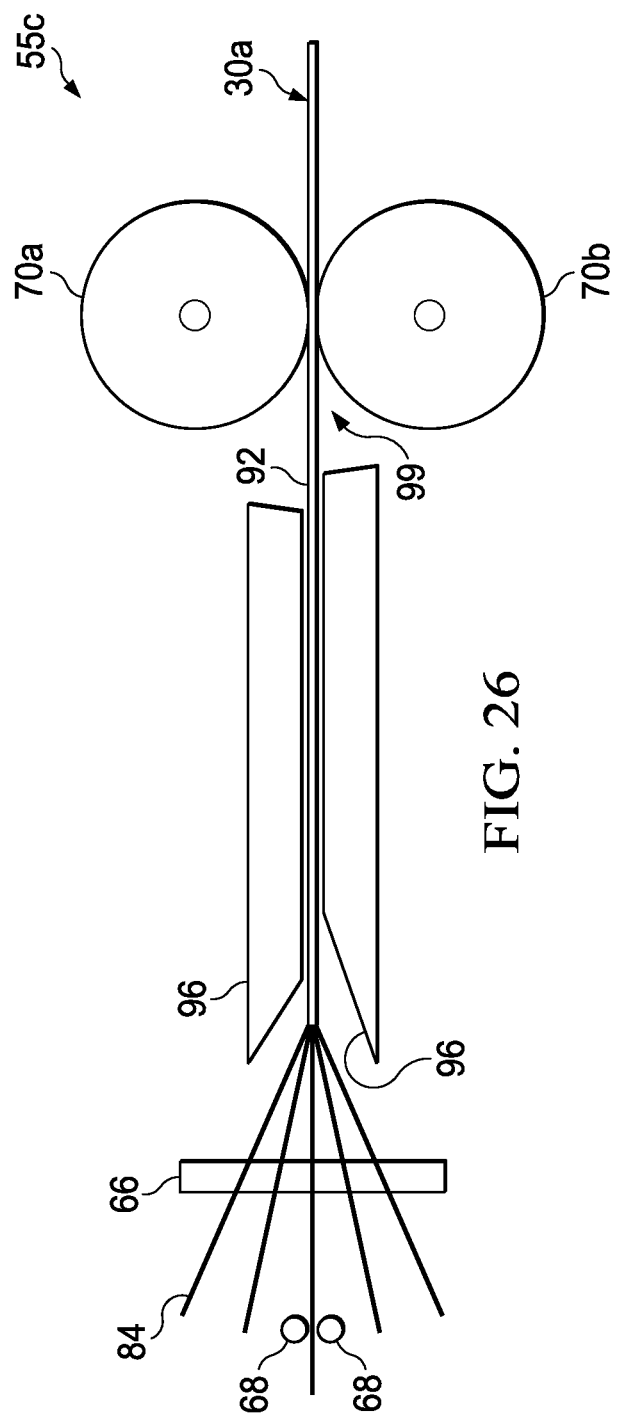
FIG. 26 is a side view of an alternate embodiment of the apparatus employing a pair of forming dies.
Figure 27:
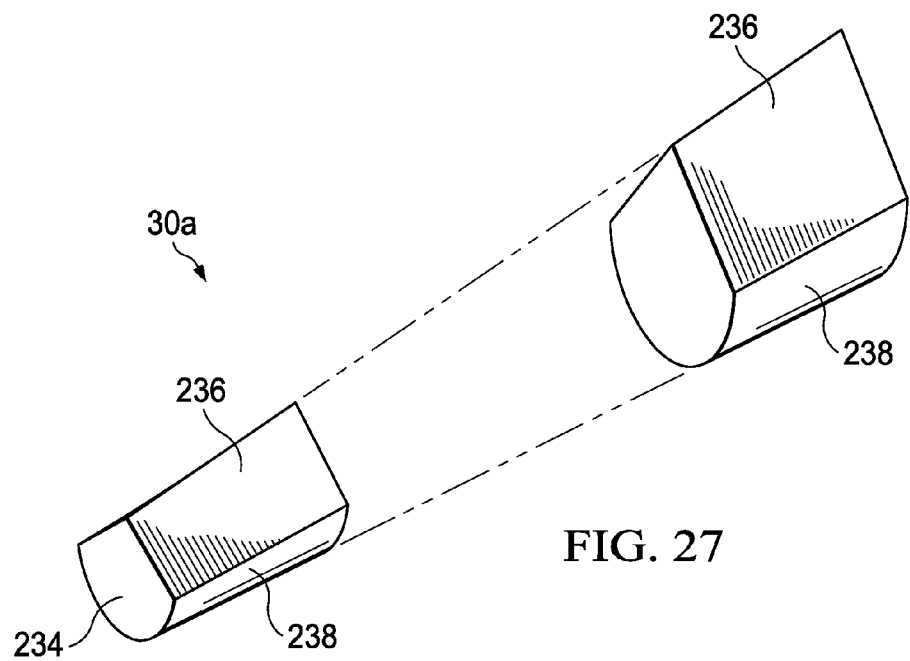
FIG. 27 is an illustration of a perspective view of a filler produced by the apparatus shown in FIG. 26.
Figure 28:
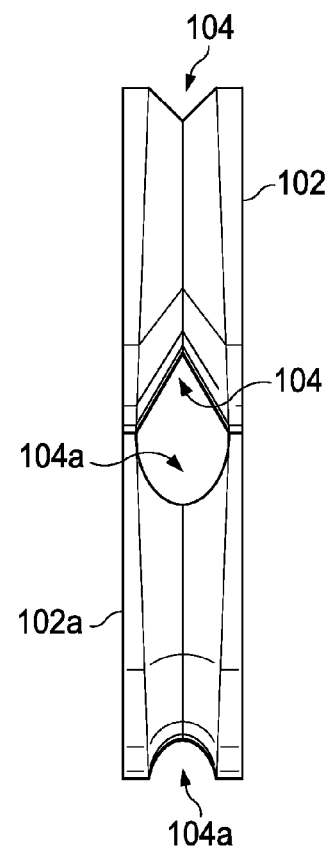
FIG. 28 is an illustration of an end view of the forming dies shown in FIG. 26.

FIGS. 26 and 28 illustrate still another embodiment of the apparatus 55c that may be employed to produce a filler 30a of the type shown in FIG. 27. In this example, the filler 30a includes upper and lower portions 236, 238 having different cross sectional shapes that vary in area or geometry along their respective lengths. A pair of rotatable dies 70a, 70b are used to form the upper and lower portions 236, 238 respectively of the filler 30a. A puller, such as the puller 64 shown in FIGS. 11, 20 and 21, pulls the ply stack 92 into a nip 99 between the dies 70a, 70b. As best seen in FIG. 28, the upper die 70a has a die cavity 104 having a generally triangular shape that varies in area around the circumference of the die 70a. Die 70b has a generally semi-circular die cavity 104a that likewise varies in cross sectional area around the circumference of the die 70b. The cross sectional shapes of the dies 70a, 70b shown in FIG. 28 are merely illustrative of a wide range of cross sectional geometries that are possible, including but not limited to those as discussed earlier with reference to the die 70 shown in FIGS. 12 and 15.

Figure 29:
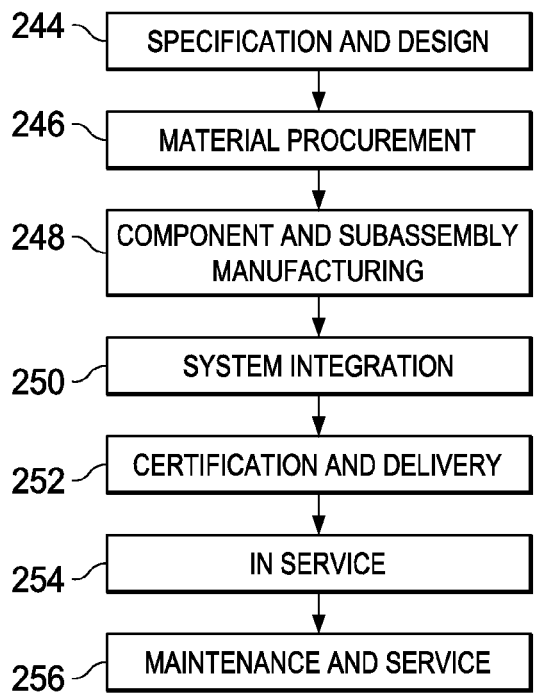
FIG. 29 is an illustration of a flow diagram of aircraft production and service methodology.
Figure 30:
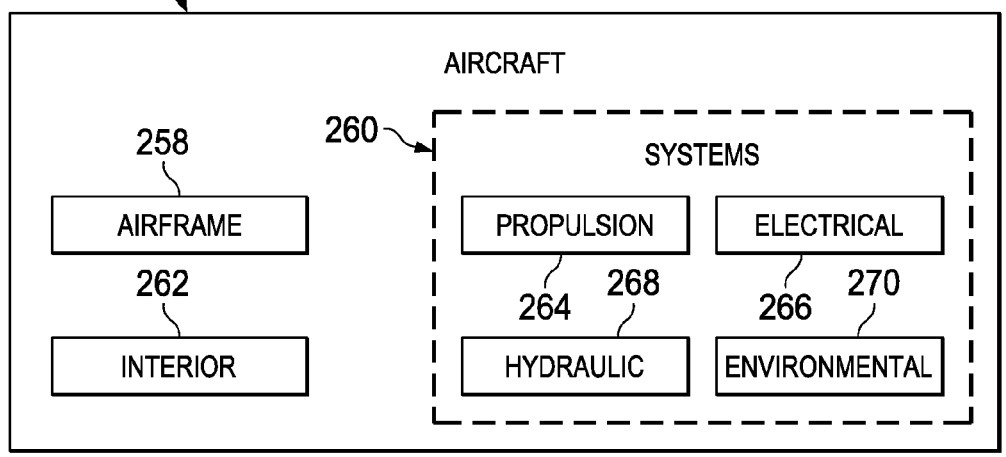
FIG. 30 is an illustration of a block diagram of an aircraft.

Embodiments of the disclosure may find use in a variety of potential applications, particularly in the transportation industry, including for example, aerospace, marine, automotive applications and other application where automated layup equipment may be used. Thus, referring now to FIGS. 29 and 30, embodiments of the disclosure may be used in the context of an aircraft manufacturing and service method 240 as shown in FIG. 29 and an aircraft 242 as shown in FIG. 30. Aircraft applications of the disclosed embodiments may include, for example, without limitation, layup of stiffener members such as, without limitation beams, spars and stringers, to name only a few. During pre-production, exemplary method 240 may include specification and design 244 of the aircraft 242 and material procurement 246. During production, component and subassembly manufacturing 248 and system integration 250 of the aircraft 242 takes place. Thereafter, the aircraft 242 may go through certification and delivery 252 in order to be placed in service 254. While in service by a customer, the aircraft 242 is scheduled for routine maintenance and service 256, which may also include modification, reconfiguration, refurbishment, and so on.

Each of the processes of method 240 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 30, the aircraft 242 produced by exemplary method 240 may include an airframe 258 with a plurality of systems 260 and an interior 262. Examples of high-level systems 260 include one or more of a propulsion system 264, an electrical system 266, a hydraulic system 268, and an environmental system 270. Any number of other systems may be included. Although an aerospace example is shown, the principles of the disclosure may be applied to other industries, such as the marine and automotive industries.

Systems and methods embodied herein may be employed during any one or more of the stages of the production and service method 240. For example, components or subassemblies corresponding to production process 248 may be fabricated or manufactured in a manner similar to components or subassemblies produced while the aircraft 242 is in service. Also, one or more apparatus embodiments, method embodiments, or a combination thereof may be utilized during the production stages 248 and 250, for example, by substantially expediting assembly of or reducing the cost of an aircraft 242. Similarly, one or more of apparatus embodiments, method embodiments, or a combination thereof may be utilized while the aircraft 242 is in service, for example and without limitation, to maintenance and service 256.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for producing a composite filler, comprising:
    at least one rotatable die having a peripheral die face adapted for forming a stack into a desired cross sectional shape to form the composite filler, the stack comprising a plurality of composite reinforced strips, wherein the die face varies in cross sectional shape around the periphery of the die;
    at least one adhesive dispenser for dispensing an adhesive;
    a device for pressing the dispensed adhesive onto the composite filler, the device including a cam face with a cross sectional area that varies around the periphery of the device; and
    a device for moving the stack through the die.

2. The apparatus of claim 1, wherein:
    the die includes a puller for pulling the stack through the die; and
    the plurality of composite reinforced strips comprise a plurality of strips of fiber prepreg.

3. The apparatus of claim 1, further comprising:
    a plurality of creels each adapted to hold and dispense one strip of prepreg material; and
    a guide for directing strips dispensed from the creels into the stack.

4. The apparatus of claim 3, wherein the guide includes a plurality of aligned slots for respectively guiding the strips dispensed from the creels into the stack.

5. The apparatus of claim 3, further comprising a cut and add device for cutting the strips dispensed from the creels and selectively adding strips dispensed from the creels to the guide.

6. The apparatus of claim 3, wherein the plurality of composite reinforced strips comprise a prepreg material, and the apparatus further comprises:
    a plurality of take-up reels adapted for taking up backing paper respectively on each of the strips dispensed from the creels as the strips are dispensed from the creels.

7. The apparatus of claim 1, further comprising:
    a chute for guiding the stack into the die.

8. The apparatus of claim 7, wherein the chute is a heated chute.

9. The apparatus of claim 1, wherein the die is substantially circular and has a central axis about which the die rotates.

10. The apparatus of claim 1, wherein the cross sectional shape of the die face is substantially V-shaped.

11. The apparatus of claim 1, further comprising a surface forming a nip into which the stack may be fed and against which the die squeezes the stack.

12. The apparatus of claim 1, wherein the die is substantially circular and the die face extends around at least a portion of an entire circumference of the die.

13. The apparatus of claim 1, wherein:
    the die is substantially circular; and
    the die face varies in cross sectional area substantially continuously around a circumference of the die.

14. The apparatus of claim 1, wherein:
    the die is substantially circular; and the die face includes at least a first circumferential section having a substantially constant cross sectional area, and at least a second circumferential section having a varying cross sectional area.

15. The apparatus of claim 1, wherein the die forms a first cross section of the stack, and the apparatus further comprises:
a second die having a peripheral die face adapted for forming a second cross section of the stack, wherein the die face of the second die varies in cross sectional shape around the periphery of the second die.

16. The apparatus of claim 1, wherein:
the dispenser includes a reel adapted to hold adhesive strips; and
the reel dispenses the adhesive strips onto the composite filler before the cam face presses the adhesive onto composite filler.

17. The apparatus of claim 1, further comprising:
a slitter for slitting a layup of prepreg plies into a plurality of strips; and
a redirect device for redirecting the plurality of strips into stacked relationship to form the stack.

18. The apparatus of claim 17, further comprising:
a controller for synchronizing the rotation of the die with operation of the device for moving the stack through the die.

19. Apparatus for producing a composite filler, comprising:
a slitter adapted to slit a multi-ply composite layup into a plurality of side-by-side strips;
a redirect device for redirecting the plurality of strips into a stack;
a forming die for forming the stack into a desired cross sectional shape the forming die comprising at least one rotatable die having a peripheral die face adapted for forming the stack into a desired cross sectional shape to form the composite filler, the stack comprising a plurality of composite reinforced strips, wherein the die face varies in cross sectional shape around the periphery of the die; at least one adhesive dispenser for dispensing an adhesive; a device for pressing the dispensed adhesive onto the composite filler, the device including a cam face with a cross sectional area that varies around the periphery of the device; and
a puller for pulling the composite layup through the slitter, the redirect device and the forming die.

20. The apparatus of claim 19, wherein the redirect device includes rollers for changing an orientation of the plurality of strips relative to each other.

21. The apparatus of claim 19, wherein the forming die is disposed between the puller and the slitter.

22. The apparatus of claim 19, wherein:
the forming die is rotatable and includes a substantially circular die face having a variable cross section around its periphery.

23. The apparatus of claim 19, wherein the redirect device includes rollers through which the plurality of strips are fed.

24. The apparatus of claim 19, further comprising:
a set of compaction rollers for compacting the stack.

25. The apparatus of claim 19, wherein the slitter includes a plurality of cutters spaced apart at differing distances to slit the layup into strips of differing widths.

26. The apparatus of claim 19, further comprising:
a heated chute into which the stack may be fed from the slitter and heated to a forming temperature.

* * * * *